United States Patent Office 2,967,854
Patented Jan. 10, 1961

2,967,854

P-XYLYLENE DIOL POLYESTERS

Janis A. Bungs, Painesville, Ohio, assignor to Diamond Alkali Company, Cleveland, Ohio, a corporation of Delaware No Drawing. Filed Feb. 6, 1957, Ser. No. 638,454

10 Claims. (Cl. 260—75)

This invention relates to novel compositions and processes wherein xylene compounds are converted into new and useful materials comprising polycondensation products thereof.

More particularly, the present invention is directed to compositions and processes involving reaction products of side chain halogenated xylenes, particularly their hydrolysis products, further reaction products thereof, e.g., polyethers, polyesters, and products obtained by reaction of such substances with other reactive materials, e.g., isocyanates.

The present invention is concerned with the utilization of xylene halides having one or more halogen atoms in the side chains, preferably p-xylene halides, i.e., p-xylene chlorides such as 1',4'-dichloro-p-xylene, 1',1',4',4'-tetrachloro-p-xylene, and 1',1',1',4',4',4'-hexachloro-p-xylene, as are readily obtained by halogenation of xylene. The present invention contemplates further reaction of p-xylene halides via hydrolysis to form p-xylylene diol for further inter-reaction with an acid or derivatives thereof.

Thus, the present invention broadly contemplates compositions of matter comprising substances obtained by co-reacting xylylene diols with an ester or acid or derivatives thereof, e.g., dihalides of dicarboxylic acids. More specifically, the present invention preferably is concerned with those substances obtained by co-reacting p-xylylene diol with an ester or an acid, notably an ester of a di-acid, preferably a di-ester of a saturated or unsaturated aliphatic acid or an aromatic acid. The invention also contemplates inclusion of up to an equimolar proportion, based on the xylylene diol incorporated, of a glycol having the formula

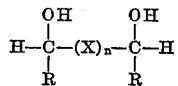

wherein R is hydrogen or alkyl, X is a methylene or cyclic radical derived from benzene, cyclohexane, furane and the like, or such methylene or cyclic radicals linked together with a hetero atom selected from the group consisting of O, S, and N, and $n$ is a number from 0 to 300, preferably 0 to 6.

Illustrative of specific acids which may be combined with xylylene diols, especially p-xylylene diol, in accordance with this invention to form new and useful products adapted for various uses, are such saturated aliphatic di-acids having the general formula $C_nH_{2n}(COOH)_2$, including straight or branched chain acids, e.g., oxalic acid, malonic acid, succinic acid, glutaric acid, sebacic acid, and adipic acid. Illustrative of suitable unsaturated di-acids of the formula $C_nH_{2n-2}(COOH)_2$, are maleic acid and fumaric acid. Illustrative of preferrred aromatic acids are terephthalic acid, p(p'diphenyldicarboxylic acid, diphenoxy-ethane-4,4'dicarboxylic acid, diphenoxy-p-xylene-4,4'-dicarboxylic acid, and p-phenylenediacetic acid. Illustrative of preferred dicarboxylic acids containing cyclic groups between the carboxyl groups are hexahydroterephthalic acid and 2,5-furandicarboxylic acid.

In addition to the foregoing acids which may be used as such, it is a preferred practice in many instances to employ esters of such acids, notably di-esters. A preferred type of di-ester comprises a di-alkyl ester of one of the foregoing di-acids. Examples of suitable and preferred specific esters include di-methyl adipate, dimethyl terephthalate, dimethyl fumerate, diethyl fumarate, diethyl maleate, di-n-butyl succinate, dimethyl sebacate, and di-ethyl sebacate. While the foregoing specific compounds are illustrative of di-alkyl esters, the term "alkyl" as used throughout the specification and claims is intended to include other dialkyl compounds such as di-ethyl-p,p'-diphenyl dicarboxylate, diethyl diphenoxyethane-4,4'-dicarboxylate, and dimethyl diphenoxy-p-xylene-4,4'-dicarboxylate as well as various alkyl groups such as methyl, ethyl, propyl, iso-propyl, butyl, and the like.

The present invention also contemplates the formation of co-reaction products by combining p-xylylene diol, an organic acid or ester, and a plasticizing glycol, preferably an aliphatic glycol such as an alkyl glycol, e.g., ethylene glycol, trimethylene glycol, tetramethylene glycol, hexamethylene glycol, diethylene glycol, triethylene glycol, polyethylene glycol, thiodiglycol, diethanolamine, and the like. Other dihydroxy compounds which may be utilized include cyclohexanediols, cyclopentanediols and copolyesters, may be formed by combining p-xylylene diol, the desired dibasic acid or ester thereof, and a plasticizing glycol. This reaction may be carried out by combining all reactants initially or by first combining p-xylylene diol with the desired acid and/or ester, and subsequently after at least partial reaction is effected, adding the plasticizing glycol and thereafter effecting further co-reaction.

Essentially, such co-reaction products formed in accordance with the present invention are esters, since p-xylylene diol acts as an alcohol and since the co-reactant acid or ester combines therewith in esterification, i.e., "ester interchange," or a so-called 'transesterification" reaction, the latter term being used in the specification and claims to mean an esterification by an exchange of alkoxy groups or of acyl groups resulting in the formation of a different ester. For the preparation of polyesters via ester interchange the reaction involves two steps and may be illustrated by the following equations:

(1) Ester Interchange

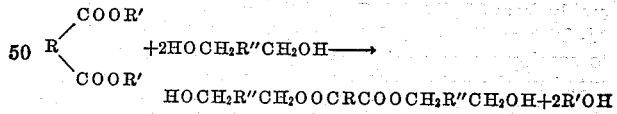

(2) Polyesterification

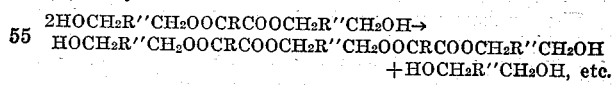

Hence, it will be appreciated that two basic types of reactions and reaction products are contemplated by the present invention: (1) the combination of p-xylylene diol with an acid or ester in an esterification or transesterification process to obtain a new and useful polyester as such and (2) the combination of p-xylylene diol with an acid or ester in an esterification or transesterification reaction which, if desired, may be carried at least partially to completion prior to the further addition of a plasticizing polyhydroxy substance, notably and preferably, a plasticizing glycol such as an aliphatic dihydroxy compound.

Further types of products embodying the invention comprise polyethers typically obtained by etherification of xylene diols and polyurethanes obtained by reaction of xylene diols with an isocyanate. More particularly, polyethers can be prepared in accordance with this invention by splitting out water from p-xylene diol or by reacting p-xylene diol with p-xylene dichloride. The resultant product in either event can then advantageously be further reacted with an isocyanate such as toluene diisocyanate. Such products are useful in the preparation of foams, adhesives, rubbers and various other materials.

While the conditions of reaction in each case will vary, of course, depending on the specific reactants employed, the equipment available for use and the product intended, the practice of this invention generally contemplates carrying out reaction (1) by employing an excess of p-xylylene diol, such, for example, as a 2:1 molar-ratio of p-xylylene diol to the diester. The mixture then is typically heated to a temperature at which the evolution of methanol, ethanol or other alcohol liberated from the diester becomes vigorous (usually at about 150°–180° C.). The heating should be conducted under conditions to prevent oxidation, i.e., the presence of oxygen should be avoided, and a slow stream of an inert gas, e.g., nitrogen or hydrogen, is advantageously passed through or over the melt.

The temperature is increased gradually to approximately 10°–20° C. below the boiling point of the diester used, but not exceeding 230°–250° C., preferably to 195°–210° C. Then the mixture is kept at this temperature until the transesterification is completed.

The time required for this step varies considerably upon the properties of the di-ester, the catalyst and its amount, the stabilizer (if employed) and the heating temperature and usually takes 2–14 hours. At the end of the transesterification, vacuum is applied and the mixture is stirred to facilitate the removal of volatile reaction products and the small amount of unreacted ester and p-xylylene diol.

It is important to accomplish the ester interchange step as completely as possible and is essential to remove the above-mentioned products from the reaction mixture before the next step, namely, polyesterification, is started.

In this step the temperature is increased to a temperature high enough to initiate and keep the polyesterification reaction going simultaneously, a sufficiently high vacuum is applied and the melt stirred vigorously to facilitate the removal of p-xylylene diol (or a second glycol) liberated in this reaction. This can be accomplished successfully if the temperature of the melt is kept at higher temperature than the boiling temperature of p-xylylene diol at the desired vacuum. Usually the temperature in this step is varied from 220°–300° C., preferably from 220°–270° C., and the vacuum is varied from 15–20 mm. Hg to 0.05–1.0 mm. Hg. It is not advisable to employ unnecessarily high temperature in this step to speed up the polyesterification reaction because temperature increase also facilitates thermal degradation and discoloration of the polyester.

The temperature must be increased and maintained only high enough to keep the mass in molten state during the entire polyesterification period. During this period, the melting point and the viscosity of the melt gradually increase. The heating is continued at least until fibers could be drawn from the melt. This step usually requires 6–12 hours. After heating is completed, the product may be extruded or otherwise removed from the reaction vessel in molten form and subsequently cooled.

The copolyesters according to this invention have been prepared either (1) by replacing part of p-xylylene diol in the initial reaction mixture with equivalent amount of another glycol chosen for a particular copolyester and following the general procedure mentioned before, or (2) by preparation of a low molecular weight polyester from p-xylylene diol and the diester employed using a smaller molar ratio p-xylylene diol to the di-esters than 2:1, and addition of the second glycol when the reaction between p-xylylene diol and the di-ester is substantially finished. After addition of the second glycol, the mixture is heated in a manner suitable for transesterification of low molecular weight polyesters with the second glycol followed by the polyesterification. Precedure (2) is used especially in cases when a copolyester is prepared containing a second glycol which glycol has a boiling point below 200° C., as, e.g., ethylene glycol.

One could expect that procedure (1) should give a copolyester with a random distribution of both glycols, while procedure (2) should give more periodical distribution of the glycols, especially, if the second glycol is used in relatively small amount, and lead to the block type copolyesters. However, contrary to expectations, a copolyester containing in a molar ratio of 0.2:0.8 ethylene glycol and p-xylylene diol as the alcoholic components and terephthalic acid as the acidic component, did not show any difference in the physical properties either prepared by procedure (1) or (2).

During the polyesterification reaction, a catalyst frequently and desirably is used. Generally, either an alkaline or an acid catalyst may be employed, although an alkaline type catalyst is preferred at present, such as an alkali metal alkoxide, e.g., sodium or potassium alkoxide alone or combined with a metal of the second or third group of the periodic table, such as zinc, magnesium or aluminum. Other suitable catalysts are aklaline-reacting metal salts such as carbonates and glycol-soluble metal salts of carboxylic acids. For the preparation of high molecular weight polyesters based on p-xylylene diol catalyst of milder alkalinity, e.g., heavy metal oxides or carbonates, and mixtures thereof are preferred.

The reactivity of p-xylylene diol with diesters generally does not vary considerably from the reactivity of (commonly used glycol, namely) ethylene glycol. However, the boiling point of p-xylylene diol is much higher (146°–154° C./0.5–1.0 mm. Hg; 188°–189° C./16–17 mm. Hg, melting point 118°–119° C.) than the boiling point of ethylene glycol (50°–55° C./0.7–0.9 mm. Hg; 100°–105°/16–20 mm. Hg) and many other glycols at the same pressure. Since p-xylylene diol is much less volatile than ethylene glycol, adequate steps should be taken to remove p-xylylene diol from the reaction mixture in the polyesterification phase and especially at the end of polyesterification when the viscosity of the melt hinders the separation of p-xylylene diol and formation of vapor bubbles.

Since at the end of the polyesterification the temperature of the melt should be kept at 250°–300° C., fast removal of the p-xylylene diol vapor is essential for the preparation of high molecular weight polyesters, because p-xylylene diol is stable against heating up to about 250° C. Above this temperature a condensation reaction starts involving the hydroxyl groups of p-xylylene diol and leading to the formation of low molecular weight polyethers. The water formed in this reaction hydrolyzes the ester linkages and thereby degrades the polyester. Since these newly formed hydroxyl groups may react further with each other, one can expect that the degradation of a polyester may proceed rapidly if the reaction conditions are not adequate for removal of the p-xylylene diol from the reaction zone or no adequate steps to minimize the ether formation are undertaken. The degradation of a polyester by water released in the reaction between two or more p-xylylene diol molecules has been demonstrated experimentally by prolonged heating of a low molecular weight polyester at 265°–270° C. without removal of p-xylylene diol by application of sufficiently high vacuum and stirring. By continued heating the viscosity of the melt somewhat increases and then constantly decreases. This degradation is followed by discoloration of the melt and results in an amorphous acetone-soluble, waxy material having a melting point below 100° C.

Polyesters of higher molecular weight and better color can be obtained if stabilizers of the type of ester-forming compounds having an ester-forming functionality greater than two are added to the reaction mixture. Such polyfunctional ester-forming compounds include derivatives of tri-, tetra-, and higher basic inorganic and organic acids such as esters, anhydrides, halides, amides or salts. The polyfunctional stabilizers also include trihydric, tetrahydric, and higher polyhydric alcohols. Among the stabilizers for this type reaction, the alkyl and aryl phosphites and phosphates are the most effective, and therefore preferred, as for example, triethyl phosphite, tricresyl phosphite, triethyl phosphate, and triphenyl phosphate.

Usually an amount of stabilizer of 0.1% based upon the weight of the ester is sufficient to obtain the desired effect. Since stabilizers of the above-mentioned type slow down the ester-interchange and polyesterification reactions, it is advisable to add the stabilizer after the ester interchange reaction is completed, preferably during the polyesterification step, but before the viscosity of the melt has reached a point where the stabilizer cannot be readily mechanically mixed with the polyester. For better distribution of the stabilizer in the polyester melt, the stabilizer can be dissolved or dispersed in the same alcohol which forms the ester to be transesterified and then added dropwise to the polyester melt while stirring vigorously.

A particularly advantageous composition formed in accordance with this invention is poly-p-xylyleneterephthalate obtained by co-reaction of p-xylylene diol and a di-alkyl terephthalate such, for example, as dimethyl terephthalate.

In the practice of this invention, p-xylene conveniently is used as a starting material for the preparation of p-xylylene diol, as well as terephthalaldehyde and/or terephthalic acid. In practice, p-xylene is first side chain-halogenated, preferably chlorinated, as will be referred to specifically hereinafter, although the terms "halogen" and "halogenated" as used throughout the specification and claims are intended to include halogens broadly, i.e., bromine, chlorine, fluorine and iodine, chlorine being perhaps most common and for that reason emphasized herein as the preferred halogen.

For the preparation of side chain-chlorinated p-xylenes, various methods can be used. For example, p-xylylene dichloride may be prepared by chlorination of p-xylene with chlorine or with acid chlorides, such as sulfuryl chloride, in the presence of light and/or suitable catalysts or by chloromethylation of benzene or benzyl chloride made from toluene. Similarly, other side chain-halogenated p-xylenes, e.g., p-xylylene dibromide, may be prepared.

Side chain-halogenation of p-xylene usually leads to a mixture of higher and lower halogenated products. For example, side chain-chlorination of p-xylene with chlorine gives a mixture containing p-xylyl chloride, p-xylylene dichloride, p-xylydine dichloride as well as higher chlorinated products such as 1',1',4'-trichloro-p-xylene and 1',1',4',4'-tetrachloro-p-xylene. The hydrolysis of the side chain-chlorinated p-xylenes leads to useful products and intermediates. Thus, hydrolysis of p-xylylene dichloride, 1',1',4',4'-tetrachloro-p-xylene and 1',1',1',4',4',4'-hexachloro-p-xylene gives p-xylylene diol, terephthalaldehyde and terephthalic acid, respectively. For the preparation of p-xylylene diol, an alkaline hydrolysis is preferred. The crude p-xylylene diol is purified either by recrystallization from water, from an organic solvent or by distillation in vacuo.

In order that those skilled in the art may more completely understand the present invention and the preferred methods by which the same may be carried into effect, the following specific examples are offered. In all the examples, the condensations mentioned are carried out in an atmosphere of nitrogen to avoid the oxidative degradation of the polyester. But before heating was started air was replaced by pure and dry nitrogen. To accomplish this, air was removed from the condensation apparatus by applying a vacuum, pure nitrogen was allowed to enter the apparatus. Evacuation and filling with nitrogen was repeated 4–5 times before the condensation was started. During the transesterification phase a slow stream of nitrogen was passed through or over the melt to facilitate the removal of the alcohol liberated in the reaction.

*Example 1*

A mixture of 6.9 gm. (0.05 mol) of p-xylene diol, 8.7 gm. (0.05 mol) of dimethyl adipate and 5 drops of 2.5% by weight solution of sodium methylate in methanol, together with a small quantity of magnesium ribbon is heated, first at 195°–200° C. for 3.5 hours, and then at 215°–220° C. for 9 hours. A vacuum is then applied and the mixture heated at 220°–225° C./16–18 mm. Hg for 5 hours, and at 220°–225° C./0.5–1.0 mm. Hg for 12.5 hours.

There results a condensation product of dimethyl adipate and p-xylylene diol comprising a light yellow, opaque solid. On heating to 60°–65° C. it becomes transparent, tacky, and rubbery but does not liquefy upon further heating up to 300° C. In polar solvents like dimethyl formamide, acetyl morpholene and propylene carbonate, both cold and boiling, the product swells considerably but does not dissolve.

*Example 2*

A mixture of 8.3 gms. (0.06 mol) of p-xylylene diol, 5.2 gms. (0.03 mol) of dimethyl adipate, 5 drops of a 2.5% solution of sodium methoxide in methanol and a small quantity of magnesium ribbon is heated at 195°–200° C. for 13.5 hours. A vacuum is then applied and the mixture heated at 195°–205° C./18–20 mm. Hg for 10 hours, 195°–205° C./1–2 mm. Hg for 12 hours and finally at 200°–205° C./0.1–0.5 mm. Hg for 7.5 hours.

There results a condensation product of dimethyl adipate and p-xylylene diol comprising a yellowish, opaque solid which became transparent, soft and tacky at 50°–55° C. and transformed in a viscous melt at 70°–75° C. Pliable fibers can be drawn from the melt.

*Example 3*

A mixture of 17.4 gms. (0.1 mol) of dimethyl adipate, 27.6 gms. (0.2 mol) of p-xylylene diol, 0.004 gm. of PbO and 0.01 gm. of $Sb_2O_3$ is heated at 240°–245° C. for 2.5 hours. A vacuum is then applied and the mixture heated at 240°–245° C./200–245 mm. Hg for one hour, at 240°–245° C./25–30 mm. Hg for 2.5 hours, and at 240°–245° C./0.1–0.5 mm. Hg for 7 hours.

The polyester thus prepared is a bluish gray, opaque, tough solid, which melts at 75°–80° C., giving a viscous melt. Pliable and elastic fibers can be drawn from the melt.

*Example 4*

A mixture of 10.45 gm. (0.06 mol) of p-xylylene diol and 5.8 gm. (0.03 mol) of dimethyl terephthalate is worked up in accordance with the method of Example 1, except that at the end of the condensation reaction, the mixture is heated at 245°–250° C./0.05–0.1 mm. Hg for 16 hours.

The resultant transesterification product of dimethyl terephthalate and p-xylylene diol is a yellowish, opaque, brittle solid, softening at 200°–205° C. and liquefying at 225°–230° C. This material dissolves on heating in polar solvents such as dimethyl formamide, acetyl morpholene, and propylene carbonate.

*Example 5*

A mixture of 19.4 gms. (0.1 mol) of dimethyl terephthalate, 27.6 gms. (0.2 mol) of p-xylylene diol, 0.004 gm. of PbO, and 0.01 gm. of $Sb_2O_3$ is heated at 220°–225°

C. for 3 hours and at 240°–245° C. for 2 hours. A vacuum is then applied and the mixture heated at 240° C.–245° C./20–25 mm. Hg for 3 hours. Heating and vacuum are then interrupted and nitrogen passed through the apparatus at atmospheric pressure. When the temperature of the melt is about 150° C. a solution of 0.02 gm. of tricresyl phosphite in 1 ml. of methanol is added dropwise to the melt while stirring.

This is followed by evacuation of the apparatus and heating of the contents at 240°–245° C./0.5–1.0 mm. Hg for 2 hours and at 260°–265° C./0.5–1.0 mm. Hg for 5 hours.

The condensation product is a grayish, opaque, hard, brittle solid, which melts at 280°–285° C., strong and stiff fibers showing good cold-drawing properties at temperatures above 50°–60° C. can be drawn from the melt. The melt poured in water at room temperature transforms into a transparent, grayish solid which softens at 85°–90° C. (amorphous form) and becomes opaque and solid after remaining at this temperature for 1–2 minutes (crystalline form).

*Example 6*

Using the procedure of Example 1, p-xylylene diol and di-ethyl fumarate are co-reacted using molar proportions of 2:1, respectively. There is thus obtained a condensation product of p-xylylene diol and diethyl fumarate comprising a light brown, transparent, hard, brittle solid which does not soften on heating and which decomposes without melting. The condensation product is insoluble in acetone, dimethyl formamide, acetyl morpholene and propylene carbonate, both cold and boiling.

*Example 7*

The procedure of Example 6 is repeated using di-ethyl maleate instead of di-ethyl fumarate. The resultant condensation product of p-xylylene diol and diethyl maleate is characterized by the same type of properties exhibited by the product of the preceding example.

*Example 9*

PART A

There are combined 0.1 mol dimethyl terephthalate and 0.09 mol p-xylylene diol. This mixture is heated for 2 hours at 150°–190° C., 21 hours at 195°–200° C., 2 hours at 220°–225° C., 2 hours at 220°–225° C./25–30 mm. Hg, using sodium methoxide-magnesium catalyst. At this point there is introduced 0.02 mol ethylene glycol and the resultant mixture heated 15 hours at 220°–225° C., 23 hours at 225°–250° C./30–35 mm. Hg, 3 hours at 245°–250° C./1–2 mm. Hg, and 12 hours at 265°–270° C./0.5–1 mm. Hg. There results a crystalline, light brown, opaque, hard, brittle, solid product melting at 220°–225° C. An amorphous product also is obtained comprising a brown, transparent, hard, brittle solid softening in the range from 90–95° C. Both forms are soluble in at least one of the following solvents, cold or boiling: acetone, dimethyl formate, acetyl morpholene and propylene carbonate. Moreover, both forms are characterized by fiber-forming properties.

PART B

Following this procedure, the copolyesters of p-xylylene diol and ethylene glycol mentioned in Table I are prepared to yield equally advantageous products.

*Example 10*

A further example of the preparation of a copolyester by transesterification of dimethyl terephthalate (DMT) with p-xylylene diol (p-X—(OH)$_2$) and hexamethylene glycol (Hex(OH)$_2$), a two-stage operation generally as described in preceding example comprises heating dimethyl terephthalate and p-xylylene diol at 200°–205° C. for 2–4 hours, followed by heating at 220°–225° C. for 2 to 4 hours. Unless otherwise indicated, the glycol is then added and further reaction carried out via heating as described in the prior examples. A series of such reactions are conducted, the results being indexed comparatively in the following table:

| Example Number | Components (Mols) | | | Properties of the Products [3] | | |
|---|---|---|---|---|---|---|
| | DMT | p-X—(OH)$_2$ | Hex (OH)$_2$ | Most Stable Form | M.P. or S.R.[1] (°C.) | Appearance |
| 11 | 0.1 | 0.05 | 0.10 | Amorphous | 60–65 | Yellowish, transparent solid. |
| 12 | 0.1 | 0.07 | 0.06 | ___do___ | 55–60 | Lt. brown transparent solid. |
| 13 | 0.1 | 0.075 | 0.05 | Amorphous and Crystalline | 65–70 / 195–200 | Yellowish transparent solid. Yellowish opaque solid. |
| 14 [2] | 0.1 | 0.075 | 0.05 | Amorphous and Crystalline | 65.70 / 180–185 | Yellowish transparent solid. Yellowish opaque solid. |
| 15 | 0.1 | 0.08 | 0.04 | Amorphous and Crystalline | 80.85 / 205–210 | Yellow, transparent solid. Yellowish opaque solid. |
| 16 | 0.1 | 0.09 | 0.02 | Crystalline | 202–205 | Do. |

[1] S.R. means softening range.
[2] Single step condensation—both glycols are added simultaneously.
[3] All copolyesters prepared are soluble in hot dimethyl formamide, propylene carbonate and acetyl morpholine.

*Example 8*

A mixture of 13.8 gm. (0.1 mol) of p-xylylene diol, 11.5 gm. (0.05 mol) of di-n-butyl succinate, 5 drops of a 2.5% by weight solution of sodium methylate in methanol, together with a small quantity of magnesium ribbon is heated at 195°–205° C. for 25 hours. A vacuum is then applied and the mixture heated at 200°–205° C./16–18 mm. Hg for 19 hours at 220°–225° C./1–2 mm. Hg for 3.5 hours, and finally at 250°–270° C./0.5–1.0 mm. Hg for 6 hours. A light yellow, transparent, rubbery solid is obtained. This material decomposes on heating without melting and is insoluble, i.e., it does not dissolve in acetone, dimethyl formamide, acetyl morpholene, and propylene carbonate, cold or boiling.

*Example 17*

A mixture of 13.8 gms. (0.1 mol) of p-xylylene diol, 15.3 gms. (0.1 mol) of furmaryl chloride and 50 ml. of toluene is heated gradually until reaction starts. Heating is then discontinued and when the reaction slows, the mixture is refluxed for about 45 minutes. Toluene and HCl are then removed by heating the mixture under vacuum of an aspirator and bubbling through nitrogen.

The yellowish, semi-solid residue is placed in a condensation tube under a nitrogen atmosphere and the mixture heated at 235°–240° C. for about 20 minutes. A viscous, brownish, transparent syrup is obtained. On further heating, a very fast cross-linking reaction occurs and a brownish transparent insoluble and infusible solid is obtained.

Example 18

To a boiling mixture of 13.8 gms. (0.1 mol) of p-xylylene diol and 125 ml. of toluene is added a solution of 9.1 gms. (0.05 mol) of adypyl chloride (in 50 ml. of toluene) over a period of 15 minutes with continuous agitation. A clear solution is formed. The solution is refluxed for 15 minutes. Then toluene and hydrogen chloride are removed by heating the solution under vacuum. The reaction product is a slightly yellowish semi-solid. This product, together with a mixture of 0.986 gm. of p-xylylene diol, 0.004 gm. of PbO and 0.01 gm. of $Sb_2O_3$, is placed in a condensation tube under a nitrogen atmosphere, and heated at 200°–240° C./0.5–1.0 mm. Hg for 4 hours, and at 265°–270° C./0.1–0.5 mm. Hg for 2.5 hours.

The condensation product is a light yellow, opaque, horny solid, which transforms at 45°–50° C. into a light brown tacky solid and liquefies at 100°–110° C. forming a viscous syrup. Pliable elastic fibers can be drawn from this melt.

Example 19

PART A

A mixture of 19.4 gms. (0.1 mol) of dimethyl terephthalate, 19.3 gms. (0.14 mol) of p-xylylene diol, 5.4 gms. (0.06 mol) of 1,4-butanediol, 0.004 gm. of PbO and 0.01 gm. $Sb_2O_3$ is heated at 210°–215° C. for 4 hours, at 220°–225° C. for 2 hours and at 240°–245° C. for 1 hour. A vacuum is then applied and the mixture heated at 240°–245° C./15–30 mm. Hg for 1 hour, at 240°–245° C./1–2 mm. Hg for 2 hours, and at 240°–245° C./0.1–0.5 mm. Hg for 3.5 hours.

The copolyester thus prepared is a grayish, opaque, hard solid which melts at 215°–220° C. Elastic and flexible fibers can be drawn from the melt.

PART B

Following this procedure, the copolyesters of 1,4-butanediol and p-xylylene diol mentioned in Table No. 2 are prepared to yield equally advantageous products.

Example 20

A mixture of 19.4 gms. (0.1 mol) of dimethyl terephthalate, 22.1 gms. (0.16 mol) of p-xylylene diol, 3.6 gms. (0.04 mol) of 1,4-butanediol, 0.004 gm. of PbO and 0.01 gm. of $Sb_2O_3$ is heated at 200°–215° C. for 7 hours, and at 225°–230° C. for 2 hours. Then 0.02 gm. of tricresyl phosphite is added as in Example 5. Vacuum is applied and the mixture heated at 225°–230° C./15–20 mm. Hg for 1 hour, 225°–230° C./1–2 mm. Hg for 2 hours, and finally at 260°–265° C./0.5–1.0 mm. Hg for 2 hours.

There results a condensation product comprising a grayish, opaque, tough solid which melts at 295°–300° C. giving a viscous melt. Fibers can be drawn from the melt, showing good cold-drawing properties.

Example 21

A mixture of 12.2 gms. (0.03 mol) of dimethyl diphenoxy-p-xylene-4,4'-dicarboxylate, 8.3 gms. (0.06 mol) of p-xylylene diol, 0.003 gm. of PbO and 0.0075 gm. of $Sb_2O_3$ is heated at 220°–235° C. for 5 hours, and at 230°–235° C. for 2 hours. A vacuum is then applied and the mixture heated at 230°–235° C./25–30 mm. Hg for 1 hour, at 240°–245° C./0.5–1.0 mm. Hg for 2 hours and at 270°–275° C./0.5–1.0 mm. Hg for 1 hour.

The condensation product is a gray, opaque, and tough solid, which melts at 220°–225° C. Fibers and films having good cold drawing properties can be drawn from the melt. By pouring the melt in water at room temperature, the polyester is obtained in an amorphous form, comprising gray, transparent, tough solid softening at 95°–100° C. The amorphous material if maintained at this temperature for a few minutes, becomes opaque and solid indicating the readiness to crystallize.

Example 22

A mixture of 18.4 gms. (0.1 mol) of dimethyl terephthalate, 11.1 gms. (0.08 mol) of p-xylylene diol, 0.004 gm. of PbO, and 0.01 gm. $Sb_2O_3$ is heated at 200°–205° C. for 1 hour, and at 220°–225° C. for 2 hours. The heating is then stopped and when the temperature drops to 195°–200° C., 2.5 gm. (0.04 mol) of ethylene glycol is added to the melt. The resulting mixture is heated at 195°–200° C. for 2.5 hours and at 220°–225° C. for 2 hours. A vacuum is then applied and the mixture heated at 220°–225° C./25–30 mm. Hg for 1 hour, at 240°–245° C./25–30 mm. Hg for 1 hour, at 240°–245° C./0.5–1.0 mm. Hg for 2 hours, and at 270°–275° C./0.5–1.0 mm. Hg for 0.5 hour.

The condensation product is a greenish, transparent, hard, brittle solid which softens at 110°–115° C. and when maintained at this temperature for 2–3 minutes solidifies into a greenish, opaque, tough solid. The crystallized polyester melts at 230–235° C. Strong and elastic fibers can be drawn from the melt.

As the foregoing examples indicate, a number of different types of material are obtainable in accordance with the practice of the present invention. These materials generally are adapted for a number of uses in the resinous and plastics art, including the preparation of novel fibrous materials, including synthetic fibers, filaments, woven materials, and the like, as well as films, and cast injection molded, sprayed or otherwise fabricated plastic articles of diverse uses, coatings, laminates, and the like.

The polyesters and copolyesters of this invention differ considerably in their physical properties depending upon the specific alcoholic and acidic components employed, ranging from soft, low-melting waxes to highly crystalline, high-melting, tough solids. The color varies from colorless to greenish or yellowish depending upon the conditions of preparation. At temperatures slightly above their melting points, they generally are viscous, transparent, colorless, greenish or yellowish liquids.

Polyesters derived from p-xylylene diol and maleic and fumaric acids are exceptions because they very easily form cross-linked resins which are hard and brittle at room temperature and which do not soften or melt on heating without decomposition. Also, polyesters derived from lower aliphatic diacids, such as malonic and succinic acids, show a tendency to cross-link.

These materials have solubilities in strongly polar solvents like dimethyl formamide, propylene carbonate and acetyl morpholine, cold, hot or boiling, depending upon molecular weight and other properties of the particular polyester. They are resistant to dilute acids and the commonly used solvents, cold or hot, and are little affected by cold and hot dilute alkalies. Hot concentrated inorganic acids cause discoloration and hot concentrated alkali solutions (50% or greater) cause hydrolysis of the polyesters.

The polyesters have melting points ranging from 65°–70° C. to 295°–300° C. The polyesters derived from aliphatic saturated diacids have melting points below 100° C. Exceptions are polyesters of carbonic and oxalic acids.

It is known that p-phenylene group being built in a polyester chain raises considerably the melting point, especially when this group is linked directly to one or two carbonyl groups

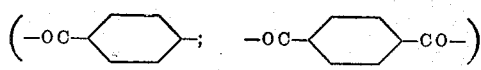

as it is, for example, in terephthalic acid molecule. Thus, for example, polyethylene adipate melts at 50°–54° while the melting point of polyethylene terephthalate is around 264° C. If p-phenylene groups are placed between —$CH_2$—O— groups, which is the case of p-xylylene diol, the melting point raising effect is much smaller, as one can see comparing the melting points of polyhexamethylene adipate (M.P. 57° C.) and poly-p-xylene adipate (M.P. 77°–80° C.). However, in combination with an aromatic diacid this effect is considerably larger. Thus, polyhexamethylene terephthalate melts around 152° C., while the melting point of poly-p-xylylene terephthalate is above 280° C.

The polyesters of this invention usually exist in two forms. If the melts are cooled rapidly, an amorphous form can be obtained. The transparent, glass-like solid of this form can be converted easily to a crystalline form by heating the solid for a short time, e.g., a few minutes, at a temperature above the softening point. This gives opaque, porcelain-like solids. The crystalline modification can also be obtained if the molten polyester is allowed to cool slowly. The softening range of the amorphous materials lies between about 75°–95° C. and above this temperature a stepwise liquefaction starts, followed by solidification (crystallization) which considerably raises the melting point. Thus, a sample of amorphous poly-p-xylylene terephthalate, softened at 85°–90° C., and after transformation to the crystalline form (crystallinity 22% by X-ray analysis) the same material melted at 240°–245° C.

Among the polyesters prepared according to this invention poly-p-xylylene terephthalate is preferred at present to other polyesters based on p-xylylene diol and aliphatic diacids, because of its higher melting point, better fiber forming properties, color and heat stability.

As one would expect, a poly-p-xylylene terephthalate chain containing in each

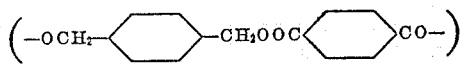

group two p-phenylene groups, should be less flexible than a polyester chain containing —CH$_2$— groups between the ester groups. Poly-p-xylylene terephthalate has also high readiness to crystallize. This, of course, determines the melting point and melting characteristics of the polyester. Poly-p-xylylene terephthalate has a relatively sharp melting point (a narrow melting range) without any appreciable softening before this temperature is reached. For some applications like moulding, extruding, extrusion of films, which could be heat sealed, softening of the material before melting is desirable.

It was found that polyesters more suitable for the above-mentioned purposes can be made as mentioned hereinbefore, by replacing part of p-xylylene diol with a second glycol from the group of glycols listed before. Incorporation of a second glycol in this polyester lowers the crystallinity and melting point and broadens the softening range before melting. Thus, it is possible to prepare a copolyester having desired flexibility and melting characteristics necessary for a specific end use.

If the second glycol is very different geometrically, crystal formation is unlikely. This results in large decrease of crystallinity and melting point of the copolyester. A glycol of this type is, for example, ethylene glycol. Small amount (less than 10 mol percent) of ethylene glycol in poly-p-xylylene terephthalate lowers the crystallinity and melting point of the original polyester considerably. In the following table are summarized the results of a series of experiments showing how the melting point and the readiness to crystallize of poly-p-xylylene terephthalate changes if a portion of the p-xylylene diol in the reaction mixture is replaced by ethylene glycol. The readiness to crystallize of the copolyester was determined by quick spreading of a drop of molten polyester on a porcelain plate. If the polyester crystallized, the readiness to crystallize was termed high. If the polyester became amorphous but crystallized upon stepwise heating of a thin sheet of the amorphous sample above the softening point, the readiness to crystallize was termed medium. If no crystallization occurred upon the above-mentioned treatment, the readiness to crystallize was termed low. The most stable form of the polyester also is set forth in the table. This is the form in which the polyester solidified if the melt in the reaction flask was allowed to cool down in the air to the room temperature.

TABLE I

| Moles | | Readiness to crystallize | Most stable form and M.P. (°C.) or S.R.[1] (°C.) of the polyester. |
|---|---|---|---|
| p-xylylene diol | Ethylene glycol | | |
| 1.0 | 0.0 | high | crystalline, M.P. 280–285. |
| 0.9 | 0.1 | medium | both: crystalline, M.P. 220–225, amorphous, S.R. 90–95. |
| 0.8 | 0.2 | ...do | both: crystalline, M.P. 195–205, amorphous, S.R. 75–80. |
| 0.7 | 0.3 | low | amorphous, S.R. 80–85. |
| 0.5 | 0.5 | ...do | amorphous, S.R. 85–90. |
| 0.3 | 0.7 | ...do | amorphous, S.R. 90–95. |
| 0.2 | 0.8 | medium | both: crystalline, M.P. 180–185, amorphous, S.R. 90–95. |
| 0.0 | 1.0 | high | crystalline, M.P. 240–245. |

[1] M.P. means melting point, S.R. means softening range.

Substitution of a part of p-xylylene diol in poly-p-xylylene terephthalate with 1,4-tetra-methylene glycol causes much smaller decrease of the melting point and crystallinity, as one can see from the results of experiments summarized in the following table:

TABLE II

| Moles | | Readiness to crystallize | Most stable form and M.P. (°C.) or S.R. (°C.) of the polyester |
|---|---|---|---|
| p-xylylene diol | Tetra-methylene glycol | | |
| 1.0 | 0.0 | high | crystalline, M.P. 280–285. |
| 0.9 | 0.1 | medium | both: crystalline, M.P. 240–245, amorphous, S.R. 80–85. |
| 0.8 | 0.2 | ...do | both: crystalline, M.P. 235–240, amorphous, S.R. 80–85. |
| 0.7 | 0.3 | ...do | both: crystalline, M.P. 215–220, amorphous, S.R. 80–85. |
| 0.0 | 1.0 | ...do | crystalline, M.P. 220. |

M.P. means melting point, S.R. means softening range.

The melting points of copolyesters of the above-mentioned type are higher or in the same range as the melting point of the poly-tetramethylene terephthalate.

Similar to 1,4-tetramethylene glycol, in effect, is 1,6-hexamethylene glycol which, if incorporated in poly-p-xylylene terephthalate, decreases the melting point and crystallinity of the copolyester slightly.

The modification of the properties of polyesters derived from p-xylylene diol is not limited in replacing part of p-xylylene diol with other glycol. A modified copolyester of p-xylylene diol and terephthalic acid was prepared by replacing terephthalic acid with adipic acid. The resulting copolyester (prepared from p-xylylene diol and dimethyl terephthalate and dimethyl adipate in proportion 9:1) has a melting point at 220°–225° C., good fiber-forming properties and color.

As one can visualize, there are numerous possibilities to modify the original properties of a polyester derived from p-xylylene diol either by incorporating a second glycol, or by reacting of p-xylylene diol with two diacids or their esters, thus giving the possibility to adjust the properties of the copolyester to a specific process or end use.

Variations in chain length, and degree of unsaturation alters considerably the characteristics and physical properties of the polyester obtained. The properties which could thus be altered and formulated at will include readiness to crystallize, melting point, viscosity, compatibility, solubility, drying characteristics, adhesion to surfaces, and many others.

Polyesters based on terephthalic acid or other aromatic diacid as the acidic component as, for example, poly-p-xylylene terephthalate, and copolyesters in which a part of p-xylylene diol is replaced by a second glycol, are useful compositions for the preparation of fibers, sheets, and other molded shapes. The compositions may be extruded in either the molten state, or in solution in suitable solvents through orifices or dies and subsequently solidified by cooling, or in the case of solutions, by contacting with a drying atmosphere or other means for removing the solvent. The fibers and films which are prepared from the high molecular weight compositions are capable of being cold drawn, which operation produces a reduction in the extensibility and increases the tensile strength of the article.

Polyesters containing high degree of unsaturation, as for example, poly-p-xylylene fumarate, may be converted by vinyl type polymerization in cross-linked hard and tough resins of value in the field of coatings.

It is to be understood that although the invention has been described with specific reference to particular embodiments thereof, it is not to be so limited, since changes and alterations therein may be made which are within the full intended scope of this invention as defined by the appended claims.

What is claimed is:

1. A polyester exhibiting both amorphous and crystalline forms, the amorphous form having a softening range between approximately 65° and 95° C. and the crystalline form having a melting point of approximately 195°–245° C., obtained by heating dimethylterephthalate with a mixture of p-xylylene diol and an alkylene glycol containing two to six carbon atoms in the presence of a polymerization catalyst selected from the group consisting of alkali metal alkoxides and heavy metal oxides, successively increasing the temperature in a stepwise manner to approximately 220°–225° C., applying at least a partial vacuum and stepwise increasing the temperature to approximately 265°–270° C., wherein the dimethylterephthalate and the diol-glycol mixture are reacted in a molar ratio of 1:1 to 1:2, inclusive, and the alkylene glycol comprises approximately 10 to 40 molar percent of the diol-glycol mixture.

2. The polyester of claim 1 wherein the alkylene glycol is ethylene glycol and comprises approximately 10 to 20 molar percent of the diol-glycol mixture.

3. The polyester of claim 1 wherein the alkylene glycol is hexamethylene glycol and comprises approximately 33 to 40 molar percent of the diol-glycol mixture.

4. The polyester of claim 1 wherein the alkylene glycol is tetramethylene glycol and comprises approximately 10 to 30 molar percent of the diol-glycol mixture.

5. Fibers formed from the polyester of claim 1.

6. Films formed from the polyester of claim 1.

7. The method of preparing a polyester exhibiting both amorphous and crystalline forms which comprises combining dimethylterephthalate with a mixture of p-xylylene diol and an alkylene glycol containing 2 to 6 carbon atoms, wherein the alkylene glycol comprises appproximately 10 to 40 molar percent of the diol-glycol mixture, such that the ratio of dimethylterephthalate to the diol-glycol mixture is in the neighborhood of 1:1 to 1:2, heating the reactants and successively increasing the temperature in a stepwise manner to approximately 220°–225° C., applying at least a partial vacuum and stepwise increasing the temperature to approximately 265°–270° C.

8. The method of claim 7 wherein the alkylene glycol is ethylene glycol and comprises approximately 10 to 20 molar percent of the diol-glycol mixture.

9. The method of claim 7 wherein the alkylene glycol is hexamethylene glycol and comprises approximately 33 to 40 molar percent of the diol-glycol mixture.

10. The method of claim 7 wherein the alkylene glycol is tetramethylene glycol and comprises approximately 10 to 30 molar percent of the diol-glycol mixture.

References Cited in the file of this patent

UNITED STATES PATENTS

| | | |
|---|---|---|
| 2,071,252 | Carothers | Feb. 16, 1937 |
| 2,139,369 | Kyrides | Dec. 6, 1938 |
| 2,237,241 | Strosacker et al. | Apr. 1, 1941 |
| 2,257,162 | Esselman et al. | Sept. 30, 1941 |
| 2,372,615 | Thomas | Mar. 27, 1945 |
| 2,744,087 | Snyder | May 1, 1956 |
| 2,762,789 | Fisher | Sept. 11, 1956 |

FOREIGN PATENTS

| | | |
|---|---|---|
| 588,833 | Great Britain | June 4, 1947 |

UNITED STATES PATENT OFFICE
CERTIFICATION OF CORRECTION

Patent No. 2,967,854            January 10, 1961

Janis A. Bungs

It is hereby certified that error appears in the above numbered patent requiring correction and that the said Letters Patent should read as corrected below.

Column 2, line 27, after "and" insert -- p-bis-(B-hydroxyethoxy)-benzene. Such products, i.e., --.

Signed and sealed this 20th day of June 1961.

(SEAL)
Attest:

ERNEST W. SWIDER            DAVID L. LADD

Attesting Officer            Commissioner of Patents